(12) United States Patent
Marinero et al.

(10) Patent No.: US 9,040,180 B2
(45) Date of Patent: May 26, 2015

(54) PERPENDICULAR MAGNETIC RECORDING DISK WITH MULTIPLE MAGNETIC LAYERS AND INTERMEDIATE DUAL NUCLEATION FILMS FOR CONTROL OF GRAIN SIZE

(75) Inventors: Ernesto E. Marinero, Saratoga, CA (US); Dieter K. Weller, San Jose, CA (US); Brian R. York, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 346 days.

(21) Appl. No.: 13/156,272

(22) Filed: Jun. 8, 2011

(65) Prior Publication Data

US 2012/0315505 A1    Dec. 13, 2012

(51) Int. Cl.
*G11B 5/66*    (2006.01)
(52) U.S. Cl.
CPC ........................................ *G11B 5/66* (2013.01)
(58) Field of Classification Search
None
See application file for complete search history.

(56) References Cited

U.S. PATENT DOCUMENTS

| 6,830,824 | B2* | 12/2004 | Kikitsu et al. | 428/828.1 |
|---|---|---|---|---|
| 7,713,389 | B2 | 5/2010 | Marinero | |
| 7,722,967 | B2 | 5/2010 | Marinero et al. | |
| 7,736,767 | B2 | 6/2010 | Bian et al. | |
| 7,833,640 | B2 | 11/2010 | Marinero et al. | |
| 2004/0247945 | A1* | 12/2004 | Chen et al. | 428/694 TS |
| 2006/0177703 | A1* | 8/2006 | Takenoiri et al. | 428/829 |
| 2007/0141400 | A1* | 6/2007 | Marinero | 428/828 |
| 2007/0243418 | A1* | 10/2007 | Fullerton et al. | 428/828 |
| 2009/0239100 | A1* | 9/2009 | Watanabe | 428/828 |
| 2010/0046116 | A1* | 2/2010 | Shimizu et al. | 360/110 |
| 2010/0247965 | A1 | 9/2010 | Onoue | |
| 2010/0255348 | A1 | 10/2010 | Sato et al. | |
| 2010/0284104 | A1* | 11/2010 | Dieny et al. | 360/55 |
| 2010/0297476 | A1 | 11/2010 | Sakai et al. | |

\* cited by examiner

*Primary Examiner* — Holly Rickman
*Assistant Examiner* — Linda Chau
(74) *Attorney, Agent, or Firm* — Thomas R. Berthold

(57) ABSTRACT

A perpendicular magnetic recording disk has a graded-anisotropy recording layer (RL) formed of at least two ferromagnetically exchange coupled CoPtCr-oxide magnetic layers (MAG1 and MAG2) with two nucleation films (NF1 and NF2) between the magnetic layers. NF1 is a metal film, preferably Ru or a Ru-based alloy like RuCr, sputter deposited on MAG1 at low pressure to a thickness between about 0.1-1.5 nm. NF2 is a metal oxide film, preferably an oxide of Ta, sputter deposited on NF1 at high pressure to a thickness between about 0.2-1.0 nm. MAG2 is sputter deposited over NF2. NF1 and NF2 provide a significant reduction in average grain size in the RL from a graded-anisotropy RL without nucleation films between MAG1 and MAG2, while also assuring that MAG1 and MAG2 are strongly exchange coupled.

14 Claims, 3 Drawing Sheets

| Nucleation Films | Average Grain Size(Å) |
|---|---|
| NO Ru or TaOx | 83.4 |
| 1 nm Ru, NO TaOx | 86.6 |
| 1 nm Ru + 0.3 nm TaOx | 80.4 |
| 1 nm Ru + 0.6 nm TaOx | 68.4 |
| 0.5 nm Ru + 0.6 nm TaOx | 78.1 |
| NO Ru, TaOx = 0.3 nm | 85.0 |
| NO Ru, TaOx = 0.6 nm | 80.5 |

FIG. 3

PERPENDICULAR MAGNETIC RECORDING DISK WITH MULTIPLE MAGNETIC LAYERS AND INTERMEDIATE DUAL NUCLEATION FILMS FOR CONTROL OF GRAIN SIZE

BACKGROUND OF THE INVENTION

1. Field of the Invention

This invention relates generally to perpendicular magnetic recording media, and more particularly to a disk with a perpendicular magnetic recording layer for use in magnetic recording hard disk drives.

2. Description of the Related Art

Perpendicular magnetic recording (PMR) disks, wherein the recorded bits are stored in a perpendicular or out-of-plane orientation in the recording layer (RL) on the disks, are used in magnetic recording hard disk drives. One type of material for the RL is a granular ferromagnetic cobalt alloy, such as a CoPtCr alloy, with a hexagonal-close-packed (hcp) crystalline structure having the c-axis oriented substantially out-of-plane or perpendicular to the RL. To induce this growth of the hcp CoPtCr alloy RL, the interlayer (IL) onto which the RL is formed is also an hcp material. Ruthenium (Ru) and certain Ru alloys, such as RuCr, are nonmagnetic hcp materials that are typically used for the IL.

The granular CoPtCr alloy RL should also have a well-isolated fine-grain structure to reduce intergranular exchange coupling, which is responsible for high intrinsic media noise. Enhancement of grain segregation in the cobalt alloy RL is achieved by the addition of oxides, including oxides of Co, Cr, Si, Ta, Ti, Nb and B. These oxides tend to precipitate to the grain boundaries, and together with the elements of the cobalt alloy form nonmagnetic intergranular material. The enhancement of segregation of the magnetic grains in the RL by the additive oxides also controls the size and distribution of the magnetic grains, which is important for achieving high areal density and recording performance.

Thus it is important that future PMR disks have CoPtCr-oxide alloy RLs with very small grains. However, very small magnetic grains can be demagnetized simply from thermal instability or agitation within the magnetized bit (the so-called "superparamagnetic" effect). The thermal stability of a magnetic grain is to a large extent determined by $K_uV$, where $K_u$ is the magneto-crystalline anisotropy of the CoPtCr alloy and V is the volume of the magnetic grain. Thus to avoid thermal instabilities of the stored magnetization, CoPtCr alloys with high $K_u$ are required, especially as the grains become smaller. However, increasing $K_u$ also increases the short-time switching field $H_0$ of the media, which is the field required to reverse the magnetization direction. For most magnetic materials $H_0$ is substantially greater, for example about 1.5 to 2 times greater, than the coercive field or coercivity $H_c$ measured on much longer time-scales. Obviously, the switching field cannot exceed the write field capability of the recording head, which currently is limited to about 12 kOe for perpendicular recording.

Additionally, to improve the writability of the RL, it is desirable for the RL to be formed of at least two ferromagnetically exchange-coupled magnetic layers having different anisotropies to provide a graded anisotropy across the thickness of the RL. This type of graded-anisotropy RL compensates for the variation in write field across the thickness of the RL and non-uniformities in the write field gradient. In CoPtCr alloys a high anisotropy is obtained by increasing the Pt content to about 22-30 atomic percent (at %) and reducing the Cr content to less than about 15 at %. However, decreasing the Cr content in CoPtCr-oxide alloys is known to adversely impact the extent of the oxide segregation boundaries and inhibits the reduction of grain size.

What is needed is a PMR disk with a graded-anisotropy RL formed of at least two CoPtCr-oxide layers wherein the magnetic grain size and the ferromagnetic exchange coupling between the individual layers can be controlled.

SUMMARY OF THE INVENTION

The invention relates to a perpendicular magnetic recording disk with a graded-anisotropy recording layer (RL) formed of at least two ferromagnetically exchange coupled CoPtCr-oxide magnetic layers (MAG1 and MAG2) with two nucleation films (NF1 and NF2) between the magnetic layers. NF1 and NF2 together control the magnetic grain size in MAG2 and the ferromagnetic exchange coupling between MAG2 and MAG1. NF1 is a metal film, preferably Ru or a Ru-based alloy like RuCr, sputter deposited on MAG1 at low pressure to a thickness between about 0.1-1.5 nm. NF2 is a metal oxide film, preferably an oxide of Ta, sputter deposited on NF1 at high pressure to a thickness between about 0.2-1.0 nm. NF1 may be just thick enough to form as a generally conformal film on MAG1. But in the ultrathin thickness regime, the thickness of each of NF1 and NF2 may be an "average" thickness of a discontinuous film, with the NF1 and NF2 material formed as discontinuous clusters. MAG2 is sputter deposited over NF2. Thus if NF1 is generally conformal and NF2 is discontinuous, then MAG2 is grown on the NF2 clusters as well as on portions of the underlying NF1. When MAG2 is deposited at a relatively low deposition or growth rate on NF2, e.g. at a sputtering pressure less than about 7 mTorr, the segregation of the magnetic grains in MAG2 is improved. NF1 and NF2 provide a significant reduction in average grain size in the RL from a graded-anisotropy RL without nucleation films between MAG1 and MAG2, while also assuring that MAG1 and MAG2 are strongly exchange coupled.

For a fuller understanding of the nature and advantages of the present invention, reference should be made to the following detailed description taken together with the accompanying figures.

BRIEF DESCRIPTION OF THE DRAWINGS

FIG. 3 is a table showing the average grain size for the composite RL formed of MAG1 and MAG2 according to the invention for different thicknesses of NF1 and NF2.

DETAILED DESCRIPTION OF THE INVENTION

Figure 1:
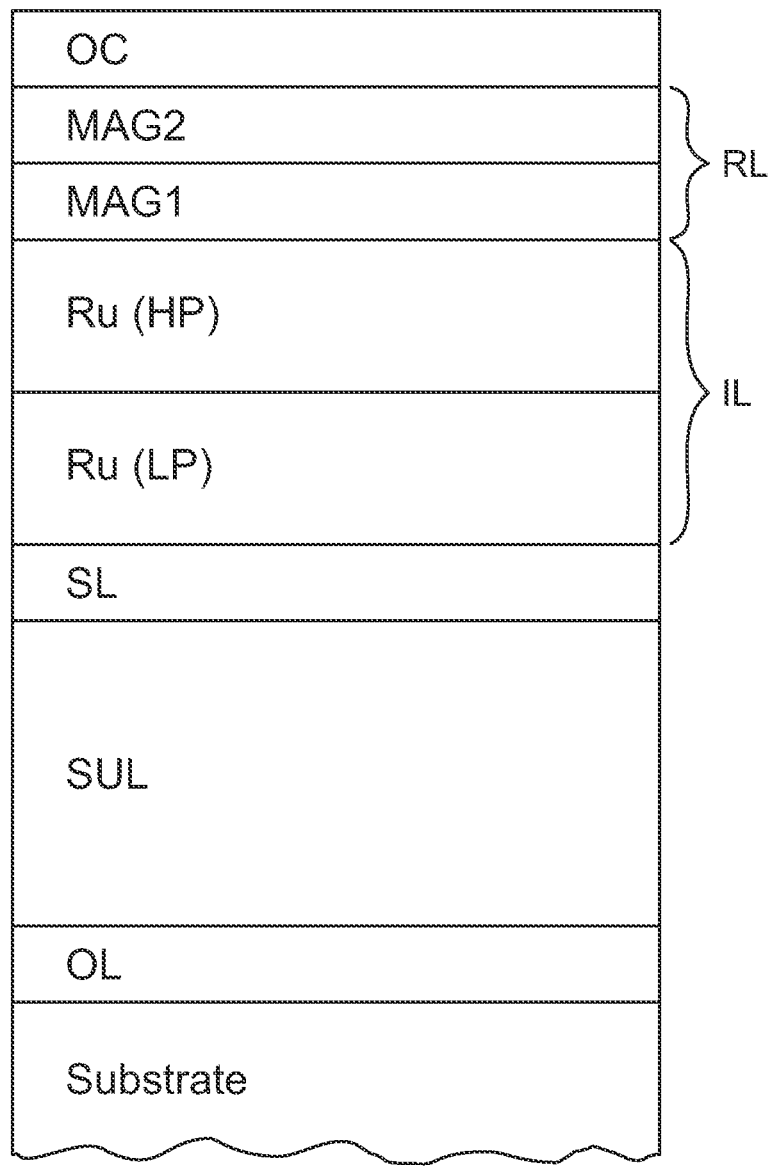
FIG. 1 is a schematic of a cross-section of a perpendicular magnetic recording disk with a recording layer (RL) formed of two magnetic layers (MAG1 and MAG2) according to the prior art.

FIG. 1 is a schematic of a cross-section of a perpendicular magnetic recording disk according to the prior art with a recording layer (RL) formed of two ferromagnetically exchange-coupled granular CoPtCr alloy magnetic layers (MAG1 and MAG2). The RL and the various other layers making up the disk are located on the hard disk substrate. The substrate may be any commercially available glass substrate, but may also be a conventional aluminum alloy with a NiP or other known surface coating, or an alternative substrate, such as silicon, canasite or silicon-carbide. A protective overcoat (OC) is formed on the RL and may be an amorphous "diamond-like" carbon film or other known protective overcoat, such as silicon nitride ($SiN_x$).

A soft magnetic underlayer (SUL) is formed on the substrate and serves as a flux return path for the magnetic write field from the disk drive write head. An adhesion layer or onset layer (OL) for the growth of the SUL may be an AlTi alloy or a similar material with a thickness of about 2-10 nm that is deposited on the substrate. The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 100 nm.

A nonmagnetic interlayer (IL) is deposited on the SUL. The IL is a nonmagnetic metal or alloy having a hexagonal close-packed (hcp) crystal structure for controlling the hcp crystal orientation in the granular RL. The IL promotes the growth of the hcp granular RL so that its c-axis is oriented substantially perpendicular, thereby resulting in perpendicular magnetic anisotropy. Ruthenium (Ru) is a commonly used material for the IL, but other materials include a metal selected from Ti, Re, and Os, and an alloy containing at least one element selected from Ti, Re, Ru, and Os, including Ru-based alloys such as a RuCr alloy. The IL may be a bilayer like a first Ru layer (5-15 nm) sputter deposited at relatively low pressure (LP), for example less than about 6 mTorr, followed by a second Ru layer (5-15 nm) sputter deposited at relatively high pressure (HP), for example greater than about 20 mTorr. The sputtering of the first Ru layer at LP is to provide adequate growth orientation for the RL. The sputtering of the second Ru layer at HP is to facilitate oxide segregation in the RL.

In the RL, each of MAG1 and MAG2 is a granular ferromagnetic CoPtCr alloy with intergranular material that includes an oxide or oxides. The oxides are typically oxides of one or more of Si, Ta, Ti, Nb and B. To achieve a graded-anisotropy RL, MAG1 and MAG2 will typically have different amounts of Pt and Cr. For example, MAG2 may have more Pt and less Cr and thus a higher anisotropy than MAG1. A graded-anisotropy RL compensates for the variation in write field across the thickness of the RL and non-uniformities in the write field gradient. The growth of MAG2 directly on MAG1 assures that the two magnetic layers are strongly ferromagnetically exchange-coupled. However, in the graded-anisotropy RL with MAG2 and MAG1 in direct contact it is difficult to control the size of the magnetic grains. The individual CoPtCr grains of MAG1 tend to increase in size as the thickness of MAG1 increases during growth of MAG1 on the underlying IL. The individual grains of MAG2 then begin growth with essentially the same size as the MAG1 grains and continue to increase in size as the thickness of MAG2 increases during growth on MAG1.

Figure 2:
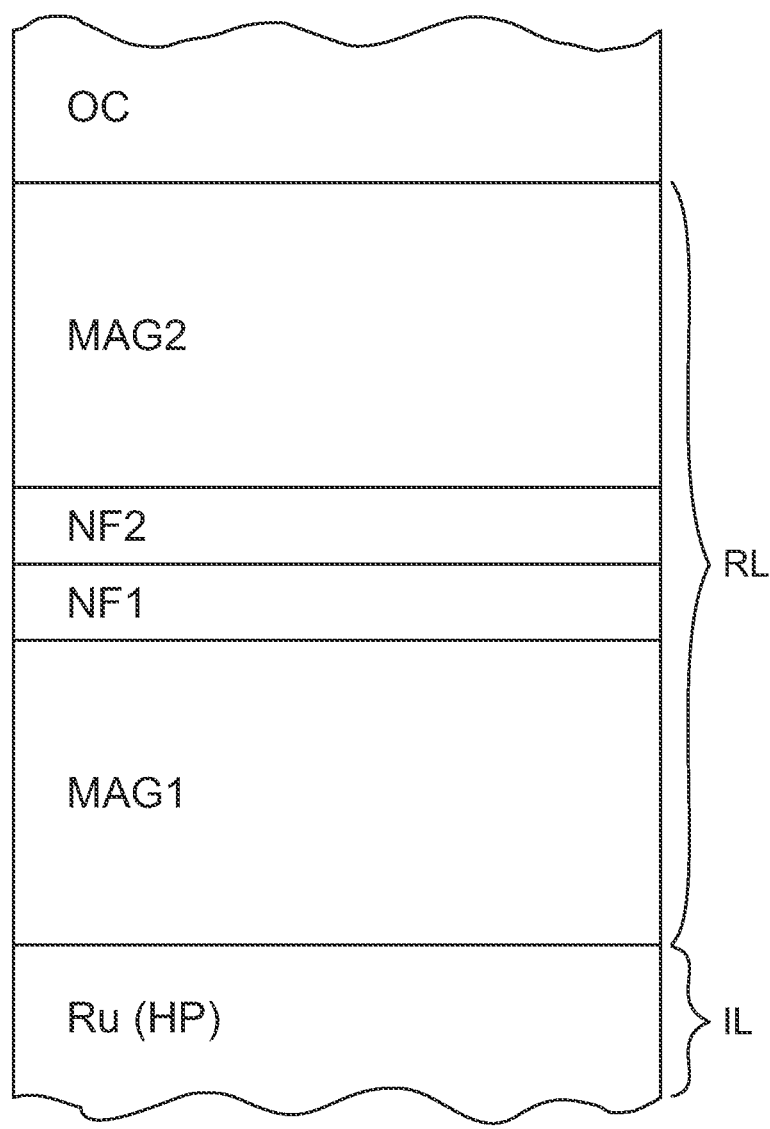
FIG. 2 is a schematic of a cross-section of a portion of a perpendicular magnetic recording disk with a recording layer (RL) with dual nucleation films (NF1 and NF2) between MAG1 and MAG2 according to the invention.

In the perpendicular magnetic recording disk according to this invention, a graded-anisotropy RL with small grains is achieved without a significant adverse effect on exchange coupling of the individual magnetic layers. FIG. 2 is a schematic of a cross-section of a portion of the perpendicular magnetic recording disk according to the invention. The structure of the disk according to the invention is similar to the disk structure shown in FIG. 1 but wherein dual nucleation films (NF1 and NF2) are located between MAG1 and MAG2.

NF1 is a metal film, preferably Ru or a Ru-based alloy like RuCr, with a thickness between about 0.1-1.5 nm. NF1 may also be a $Ru_xCo_{(100-x)}$ alloy, where x is between 30 and 70 at %. NF1 is sputter deposited on MAG1 at low pressure (less than about 10 mTorr NF2 is a metal oxide film, preferably an oxide of Ta but also an oxide of Ti, Nb, Si, Mn or Hf, with a thickness between about 0.2-1.0 nm. NF2 is sputter deposited on NF1 at high pressure (greater than about 20 mTorr). MAG2 is sputter deposited directly on NF2. NF1 may be just thick enough to form as a generally conformal film on MAG1. But in the ultrathin thickness regime, the thickness of each of NF1 and NF2 may be an "average" thickness of a discontinuous film, with the NF1 and NF2 material formed as discontinuous clusters. Thus if NF1 is generally conformal and NF2 is discontinuous, then MAG2 is grown on the NF2 clusters as well as on portions of the underlying NF1. NF1 is deposited at relatively low sputtering pressure (less than about 10 mTorr) to encourage formation of a conformal Ru film or Ru-based alloy clusters on MAG1. NF2 is deposited at high sputtering pressure to encourage the formation of metal oxide clusters. Thus the material of MAG2 is in contact with clusters of NF2 material and NF1 material which jointly control the segregation and microstructure of MAG2. Also, when the MAG2 is deposited at a relatively low deposition or growth rate on NF2, e.g. at a sputtering pressure less than about 5 mTorr, the segregation of the magnetic grains in MAG2 is improved.

FIG. 3 is a table showing the average grain size for the composite RL formed of MAG1 and MAG2 for different thicknesses of NF1 and NF2. For this data, the IL was a bilayer of a lower 13 nm thick Ru layer deposited at LP and an upper 13 nm thick Ru layer deposited at HP. MAG1 was a 6.5 nm thick layer of $[Co_{66}Pt_{22.1}Cr_{9.8}Ta_{2.1}](B_2O_3)_{3.0}(CoO)_{3.0}$ and MAG2 was a 6.5 nm thick layer of $Co_{67.1}Pt_{26}Cr_{4.8}Ta_{2.1}]$ $(B_2O_3)_{3.0}(CoO)_{3.0}$, where the subscripts in the CoPtCr alloys represent atomic percent. MAG2, with the higher Pt and lower Cr, has a higher anisotropy than MAG1. FIG. 3 shows that for a prior art structure with MAG2 in direct contact with MAG1 (no nucleation films), the grain size is 83.4 Å. The smallest grain size (68.4 Å) is obtained with a 1 nm Ru NF1 and a 0.6 nm $TaO_x$ NF2. When only the 0.6 nm $TaO_x$ NF2 was used, without a Ru NF1, a grain size of 80.5 Å was obtained. When only the 1 nm Ru NF1 was used, without a $TaO_x$ NF2, a significantly larger grain size (86.6 Å) was obtained. Thus, FIG. 3 establishes that both the Ru NF1 and the $TaO_x$ NF2 together are required to achieve the smallest grain size. The Ru NF1 stops the growth of MAG1 and initiates the growth of MAG2 with newly formed grains, rather than as grains that grow as an extension of the MAG1 grains. The $TaO_x$ NF2 provides further segregation of the grains in MAG2.

The same disk structure as used for the data of FIG. 3 was used to measure coercivity ($H_c$) of the composite RL formed of MAG1 and MAG2 with a 0.6 nm $TaO_x$ NF2 for various thicknesses of the Ru NF1. A $H_c$ of 6.12 kOe was achieved with a 0.1 nm thick Ru NF1 and 4.56 kOe with a 1 nm thick Ru NF1. For Ru NF1 thicknesses much greater than 2.5 nm, $H_c$ was unacceptably low. Also, the measured M-H loops from which $H_c$ values were derived show that with the Ru NF1 thickness less than or equal to 1.0 nm MAG1 and MAG2 are strongly exchange coupled and exhibit a single switching behavior.

Thus in the preferred embodiment NF1 should have a thickness equal to or greater than about 0.1 nm and less than or equal to about 1.5 nm, with a preferred thickness equal to or greater than about 0.5 nm and less than or equal to about 1.2 nm. NF2 should have a thickness equal to or greater than about 0.2 nm and less than or equal to about 1.0 nm, with a preferred thickness equal to or greater than about 0.4 nm and less than or equal to about 0.8 nm. This will assure a significant reduction in average grain size in the graded-anisotropy RL from a graded-anisotropy RL without nucleation films between MAG1 and MAG2, while also assuring that MAG1 and MAG2 are strongly exchange coupled.

It is important that the Ru NF1 be deposited first and grown at low sputter pressure and the metal oxide NF2 deposited over NF1 at high sputter pressure to assure independent control of the growth characteristics of NF1 and NF2. NF1 provides texture control of MAG2 whereas NF2 provides segregation control of the MAG2 grains. It has been determined that deposition of the metal oxide NF2 first, followed by deposition of the Ru, does not provide the desired results in the RL. Also, the deposition of a single film of Ru—TaO$_x$, such as by sputter deposition from a composite target, does not provide the desired results in the RL because there is no independent control of the growth characteristics of the Ru and TaO$_x$ films.

While the perpendicular magnetic recording disk according to the invention has been shown with just two magnetic layers in the RL, the RL may have three or more magnetic layers with the dual nucleation films between the additional magnetic layers.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk comprising:
    a substrate;
    an underlayer of magnetically permeable material on the substrate;
    a nonmagnetic intermediate layer (IL) on the underlayer and comprising a material selected from Ru and a Ru alloy;
    a perpendicular magnetic recording layer comprising
    a first magnetic layer (MAG1) comprising a granular ferromagnetic alloy comprising Co, Pt and Cr and one or more oxides of one or more of Si, Ta, Ti, Nb and B on the IL;
    a first nucleation film (NF1) consisting of a material selected from Ru and a Ru-based alloy on and in contact with MAG1 and having a thickness greater than or equal to 0.1 nm and less than or equal to 1.5 nm;
    a second nucleation film (NF2) consisting of an oxide of Ta on and in contact with NF1 and having a thickness greater than or equal to 0.2 nm and less than or equal to 1.0 nm; and
    a second magnetic layer (MAG2) ferromagnetically exchange coupled to MAG1 across NF1 and NF2, MAG2 being formed of a granular ferromagnetic alloy comprising Co, Pt and Cr and one or more oxides of one or more of Si, Ta, Ti, Nb and B on and in contact with NF2, wherein MAG2 has an anisotropy field greater than the anisotropy field of MAG1.

2. The disk of claim 1 wherein NF2 is a discontinuous film of oxide clusters on and in contact with NF1, wherein MAG2 is in contact with the oxide clusters of NF2.

3. The disk of claim 1 wherein NF1 is a conformal film of NF1 material on and in contact with MAG1.

4. the disk of claim 1 wherein NF1 is a discontinuous film Of NF1 material on and in contact with MAG1.

5. The disk of claim 1 wherein NF1 has a thickness equal to or greater than 0.5 nm and less than or equal to 1.2 nm.

6. The disk of claim 1 wherein NF2 has a thickness equal to or greater than 0.4 nm and less than or equal to 0.8 nm.

7. The disk of claim 1 wherein NF1 consists of a RuCr alloy.

8. The disk of claim 1 wherein NF1 consists of Ru$_x$Co$_{(100-x)}$, where x is in atomic percent and is greater than or equal to 30 and less than or equal to 70.

9. The disk of claim 1 wherein the underlayer of magnetically permeable material is formed of a material selected from the group consisting of alloys of CoFe, CoNiFe, NiFe, FeCoB, CoCuFe, FeAlSi, FeTaN, FeN, FeTaC, CoTaZr and CoZrNb.

10. The disk of claim 1 wherein the underlayer of magnetically permeable material is a lamination of multiple magnetically permeable films separated by nonmagnetic films.

11. The disk of claim 10 wherein the nonmagnetic films in the lamination provide antiferromagnetic coupling of the magnetically permeable films in the lamination.

12. A perpendicular magnetic recording disk comprising:
    a substrate;
    an underlayer of magnetically permeable material on the substrate;
    a nonmagnetic intermediate layer (IL) on the underlayer and comprising a material selected from Ru and a Ru alloy;
    a perpendicular magnetic recording layer comprising
    a first magnetic layer (MAG1) comprising a granular ferromagnetic alloy comprising Co, Pt and Cr and one or more oxides of one or more of Si, Ta, Ti, Nb and B on the IL;
    a first nucleation film (NF1) consisting of Ru on and in contact with MAG1 and having a thickness greater than or equal to 0.1 nm and less than or equal to 1.5 nm;
    a second nucleation film (NF2) on and in contact with NF1 and having a thickness greater than or equal to 0.2 nm and less than or equal to 1.0 nm, wherein NF2 is a discontinuous film of clusters consisting of an oxide of Ta; and
    a second magnetic layer (MAG2) ferromagnetically exchange coupled to MAG1 across NF1 and NF2, MAG2 being formed of a granular ferromagnetic alloy comprising Co, Pt and Cr and one or more oxides of one or more of Si, Ta, Ti, Nb and B on and in contact with said clusters of NF2 and on portions of NF1, wherein MAG2 has more Pt and less Cr than MAG1 and an anisotropy field greater than the anisotropy field of MAG1.

13. The disk of claim 12 wherein NF1 is a conformal film of NF1 material on and in contact with MAG1.

14. The disk of claim 12 wherein NF1 is a discontinuous film of clusters of NF1 material on and in contact with MAG 1.

* * * * *